J. CLIFF.
CONSTRUCTION OF DISCS FOR SCREWED STAMPER-SHANKS.
No. 190,668.  Patented May 15, 1877.
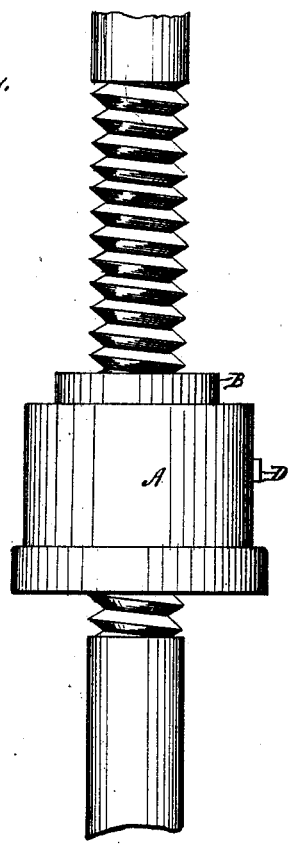
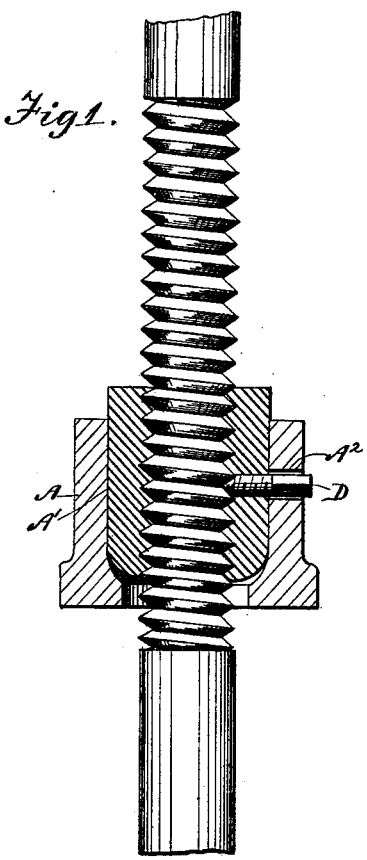
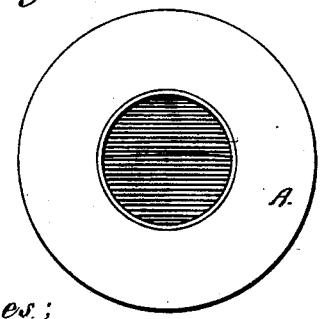
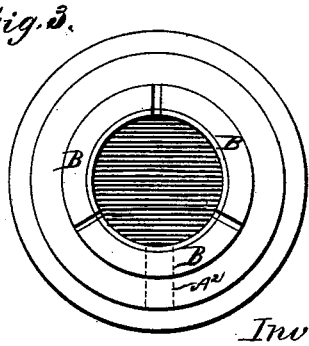
Witnesses;
Harry C. Clark
James J. Finley
Inventor,
James Cliff.
by H. W. Beadle & Co.
Attys.

UNITED STATES PATENT OFFICE.

JAMES CLIFF, OF SANDHURST, COLONY OF VICTORIA, ASSIGNOR OF ONE-FOURTH HIS RIGHT TO ABRAHAM HARKNESS AND JOHN STANWORTH MARTIN, OF SAME PLACE.

IMPROVEMENT IN THE CONSTRUCTION OF DISKS FOR SCREWED STAMPER-SHANKS.

Specification forming part of Letters Patent No. 190,668, dated May 15, 1877; application filed November 27, 1875.

*To all whom it may concern:*

Be it known that I, JAMES CLIFF, of Sandhurst, in the Colony of Victoria, engineer, have invented Improvements in the Construction of Disks for Screwed Stamper-Shanks, of which the following is a specification:

This invention consists of certain improvements in disks for those kinds of stamper-shanks which have a screw cut on them for the purpose of adjusting the disks thereon.

My disks have neither nuts, nor bolts, nor screws, but consist of an outer casing, which is made to wedge itself onto the inner one. The working-face of this outer casing I prefer to be of chilled iron; but, if preferred, the ordinary method may be observed of shrinking on an iron or steel ring on the bottom.

The outside of the inner casing is made to taper downward, so as to fit tightly in a chamber in the outer casing, made in the form of an inverted cone. The inner face of the inner casing has a screw cut on it, so as to admit of its adjustment up and down the stamper-shank. A pin projects from the outside of the inner casing through a slot in the outer casing, in order to prevent its falling down when not wedged on the inner casing; or the mechanical arrangement may be reversed, and the pin project from the inside of the outer casing into a slot in the inner casing. The inner casing must be so made as that when released from the pressure of the outer one it will turn on the shank with freedom, and thus permit of its adjustment.

For this purpose I prefer to make it in two or more pieces or vertical sections, and so that there will be a slight vertical space between each, although I believe it is possible that there might be sufficient elasticity in the metal to answer the purpose if it were made in one piece, with a vertical slot cut in it from top to bottom; but I prefer it in more than one piece, each tapering downward, both in width and thickness.

In order that my invention may be clearly understood, I will proceed to refer to the drawings or plans hereto attached, which clearly illustrate my invention.

Figure 1 represents a vertical section of one of my disks in position on a screwed stamper-shank, with the pin projecting from one of the vertical sections of the inner casing into a slot in the outer casing, which has a chilled working-face. Fig. 2 shows an elevation of same; Fig. 3, plan of top; Fig. 4, plan of bottom.

A is the outer casing, with chilled-iron face $A^1$ and slot $A^2$. B B are the sections of the inner casing, (of which, in this illustration, there are three, but the number may be varied, as hereinbefore stated.) D is the pin projecting from one of them into slot $A^2$ in the outer casing.

Figs. 1 to 4 represent the disk in working condition on the stamper-shank; but in the event of its becoming necessary or advisable to alter its position on the shank, a small tap must be given to the top of the outer casing, which would then fall down altogether were it not for the pin D arresting its descent by catching against the top of the slot $A^2$. The disk can then be raised or lowered by rotating it, so as to screw the inner casing up or down the shank.

When adjusted, another tap may be given to the under side of outer casing, so as to replace it in its former position; or it may be left for the cam to do so as it strikes against it in its effort to lift the stamper.

From the foregoing description it will be understood that in consequence of the construction described the adjusting portion of the disk and that portion which is struck by the cam are made independent of each other, so that the first may be made loose upon the shank, for the purpose of being readily adjusted without interfering with the fixedness of the device as a whole when the parts are in position for use.

Having thus described the nature of my invention, and the manner of performing the same, I would have it understood that I do not confine myself to precise details, so long as the nature thereof be retained; but

What I do claim as my invention is—

1. The combination of the inner casing $A^1$, outer casing A, and retaining-pin D, substantially as described.

2. In combination with the pin D, fixed in the inner casing, the outer casing having the slotted opening $A^2$, whereby it is adapted to move in a vertical direction, as described.

JAMES CLIFF.

Witnesses:
HILTON CARTER,
JOHN WOOD.